US006942082B1

(12) United States Patent
Bunnow et al.

(10) Patent No.: US 6,942,082 B1
(45) Date of Patent: Sep. 13, 2005

(54) DRIVE COUPLING

(75) Inventors: Marcus Bunnow, Decatur, IL (US); Edward L. Walsh, Chicago, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 10/684,603

(22) Filed: Oct. 14, 2003

(51) Int. Cl.[7] .......................... F16D 21/00; F16D 23/12
(52) U.S. Cl. .......................... 192/49; 180/6.2; 192/69.4; 192/69.43; 192/69.5; 192/89.29
(58) Field of Search ...................... 192/49, 69.4, 69.43, 192/69.5, 69.91, 89.29, 99 S; 180/6.2; 403/1

(56) References Cited

U.S. PATENT DOCUMENTS 1,734,718 A 11/1929 Donald
2,137,778 A 11/1938 McCullough
2,291,151 A * 7/1942 Dunn ........................ 192/69.5
2,566,724 A 9/1951 Heil
3,050,321 A * 8/1962 Howe et al. ................... 403/1
3,351,364 A * 11/1967 Warn et al. .................... 403/1
3,418,857 A * 12/1968 Klein ...................... 192/89.29
4,014,421 A * 3/1977 Johnson ..................... 192/69.5
4,282,959 A * 8/1981 Schachner ................. 192/69.4
4,293,061 A * 10/1981 Brown ...................... 192/69.4
5,018,592 A 5/1991 Buchdrucker
5,427,217 A 6/1995 Patridge
6,363,630 B1 4/2002 Ziegler
6,578,292 B2 6/2003 Dowe et al.
6,651,529 B1 * 11/2003 Poplawsli et al. ............ 74/607
2002/0112934 A1 * 8/2002 Karambelas et al. ..... 192/69.43
2002/0179391 A1 * 12/2002 Cox et al. ..................... 192/38

* cited by examiner

*Primary Examiner*—Rodney H. Bonck
(74) *Attorney, Agent, or Firm*—Neal, Gerber & Eisenberg LLP

(57) ABSTRACT

A drive coupling mechanism for use in connecting an axle or other drive shaft to a wheel hub for use in a snow thrower or other vehicle, or in other applications where a driven wheel is engaged to a drive shaft. A slider member is mounted on and driven by the axle, and cooperating engagement structures located on the slider and the inner surface of the wheel hub are used to engage and disengage the wheel hub from the axle depending on the location of the slider member. A bearing ring or similar structure may be used to facilitate the engagement of the cooperating engagement structures.

25 Claims, 8 Drawing Sheets

DRIVE COUPLING

BACKGROUND OF THE INVENTION

This invention relates generally to drive devices, and more particularly, to a coupler for use in connection with a drive device and an output shaft or axle. Such drive mechanisms may be used in a walk behind snow thrower or blower, a walk behind mower, tiller or other suitable vehicles. This invention could also be used in non-vehicle applications where the disclosed coupling feature is desired.

SUMMARY OF THE INVENTION

The coupler of the present invention may be mounted to one or more output shafts, which may also function as axle shafts to drive the wheels of a vehicle. By attaching such a coupler by means of a linkage to a hand-controlled actuator, an operator may engage or disengage the coupler to engage or disengage a drive device with respect to vehicle wheels. In an application where a pair of couplers are mounted on a solid axle shaft, selective engagement and disengagement of the couplers will permit steering of the driven mechanism.

Other benefits and objects of this invention are disclosed herein and will be obvious to readers of ordinary skill in the art. The features disclosed herein can be combined to create a unique design; it should be understood, however, that such features are unique in their own right and can be used independently with other transmission, transaxle or vehicle designs, as will be obvious to one of ordinary skill in the art.

DETAILED DESCRIPTION OF THE DRAWINGS

Figure 1:
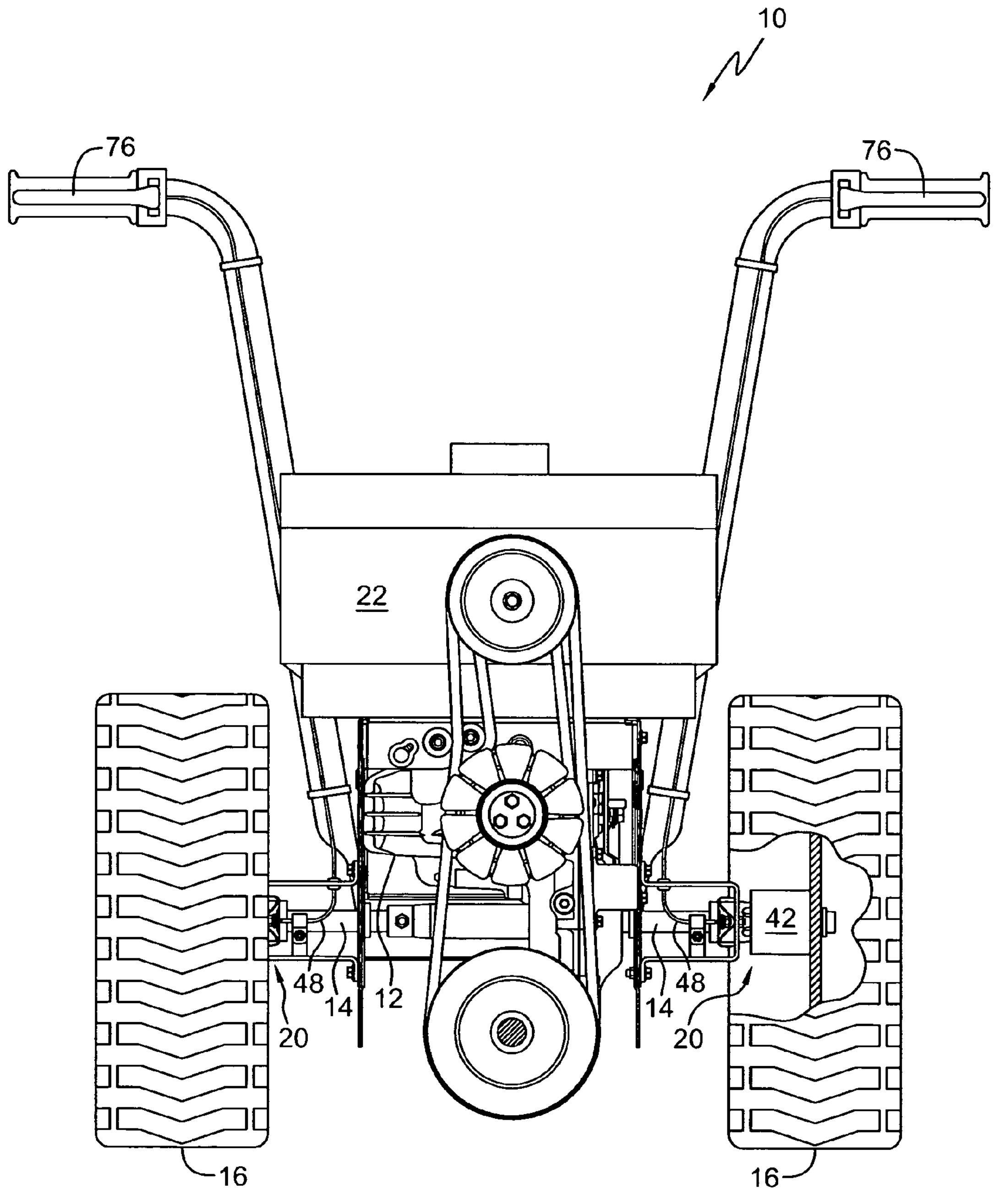
FIG. 1 is an end view of a snow thrower incorporating one embodiment of the present invention, with certain elements removed for clarity and with a portion of one tire sectioned.
Figure 2:
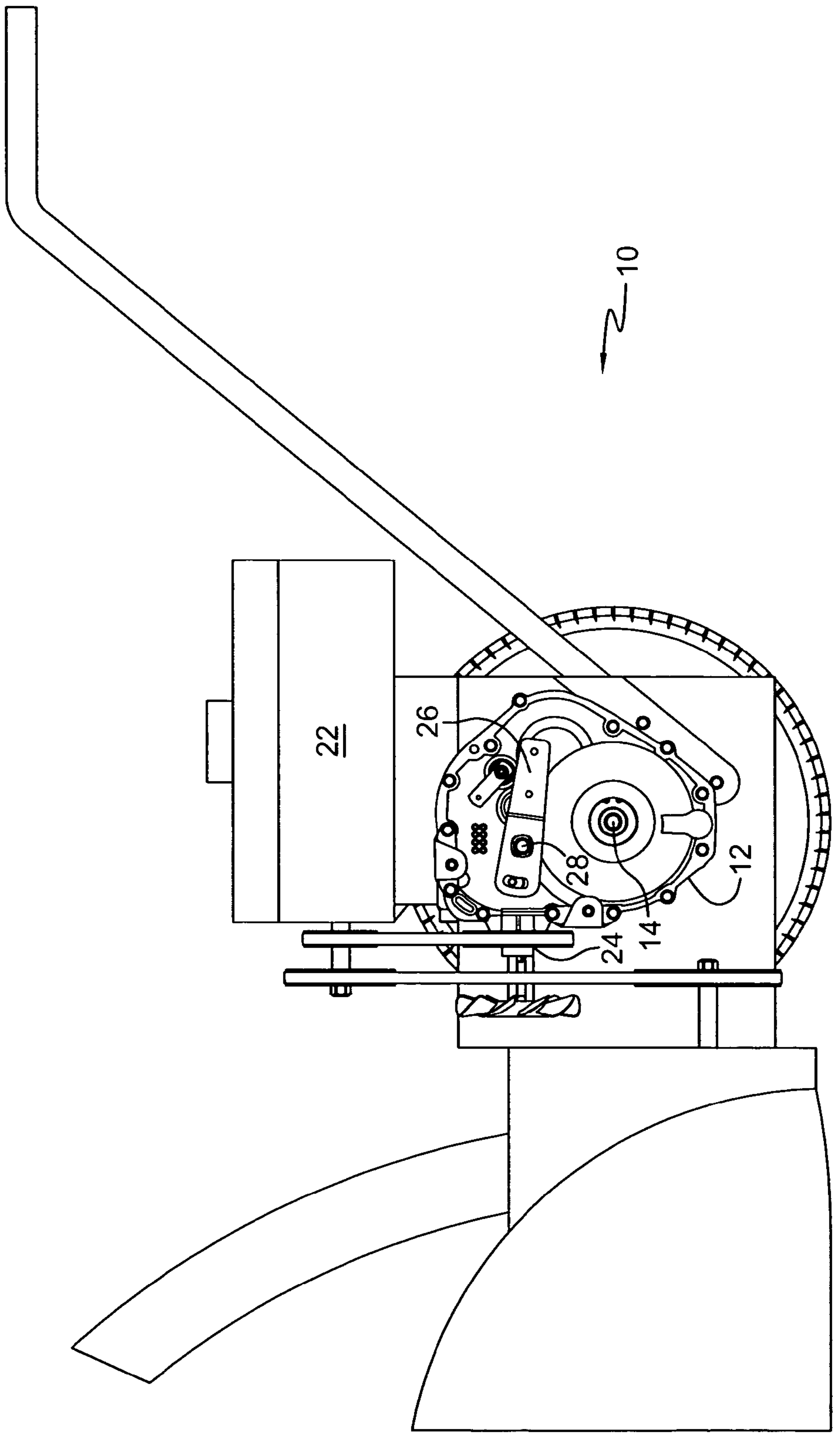
FIG. 2 depicts a side elevational view of the snow thrower of FIG. 1, with certain elements removed for clarity.

Turning now to the figures, wherein like reference numerals refer to like elements, there is generally illustrated in FIGS. 1 and 2 a walk behind implement in the form of snow thrower 10 with a drive device in the form of a hydrostatic transaxle 12. As noted above, the use of snow thrower 10 is exemplary, as this invention could be used with various applications. In these figures, multiple embodiments are depicted and the reference numerals for similar elements between embodiments generally have the same item number with a numerical prefix added.

In the embodiment depicted in FIGS. 1 and 2, hydrostatic transaxle 12 has a single output shaft 14 driving wheels 16. A pair of coupler mechanisms 20 in accordance with the present invention are used to connect and disconnect drive torque from hydrostatic transaxle 12 to wheels 16.

Transaxles such as that shown in FIGS. 1 and 2 generally operate on the principle of a prime mover 22 driving an input 24. As known in the art, e.g., input 24 drives a variable hydraulic pump. The detailed internal structure of hydrostatic transaxle 12, including the hydraulic pump and motor, swash plate and the like, is not shown herein, but the reader is referred to U.S. Pat. Nos. 5,314,387 and 6,122,996, both of which are incorporated herein by reference, for a description of such structure.

It will be understood that the displacement of the variable pump is controlled by the position of a control arm 26, which is non-rotatably mounted to trunnion 28 and which rotates trunnion 28 to position a movable swash plate to vary the displacement of the hydraulic pump. Fluid from the hydraulic pump flows through porting to a hydraulic motor, which then drives a motor shaft. The motor shaft may also be an output shaft, or the motor shaft may drive a gear reduction that then drives an output shaft 14, which in the embodiments depicted herein is an axle shaft. By varying the angle and direction of swash plate rotation, the direction of rotation and speed of the motor shaft is varied.

Other hydrostatic transmission and transaxle designs are known in the art and could be used with the present invention. Similarly, while the use of hydrostatic transaxle 12 is the preferred embodiment, this invention could be used with other drive devices, including mechanical transmissions and the like.

Figure 3:
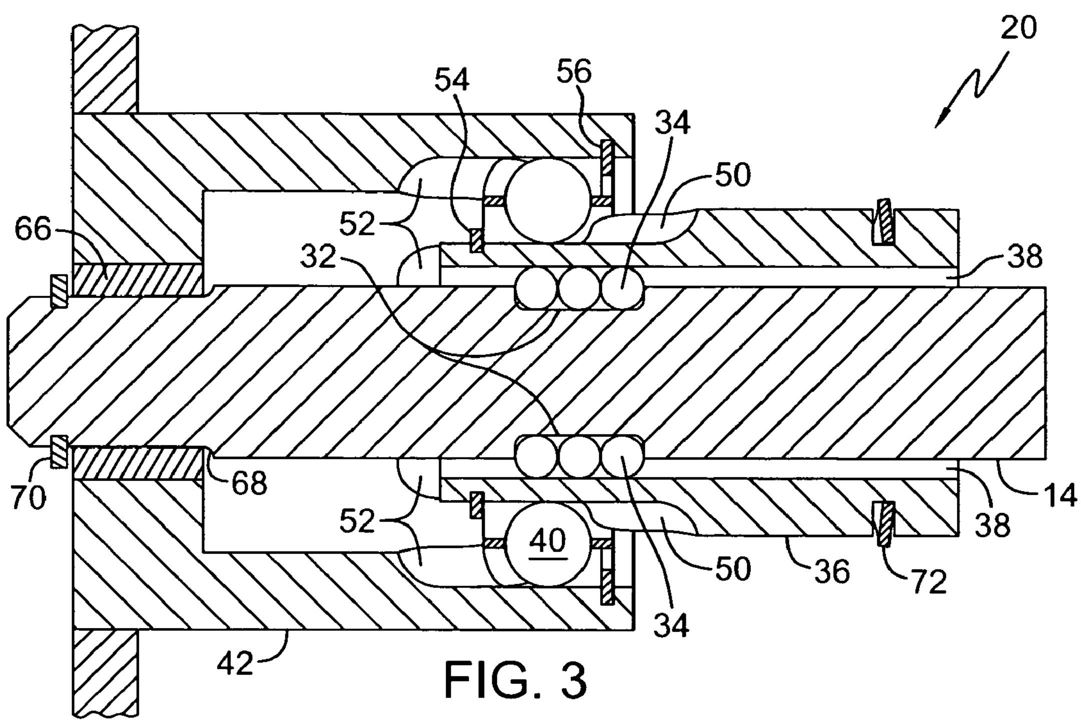
FIG. 3 is a sectioned view of the coupler of one embodiment of this invention, where the coupler is in the disengaged position.
Figure 4:
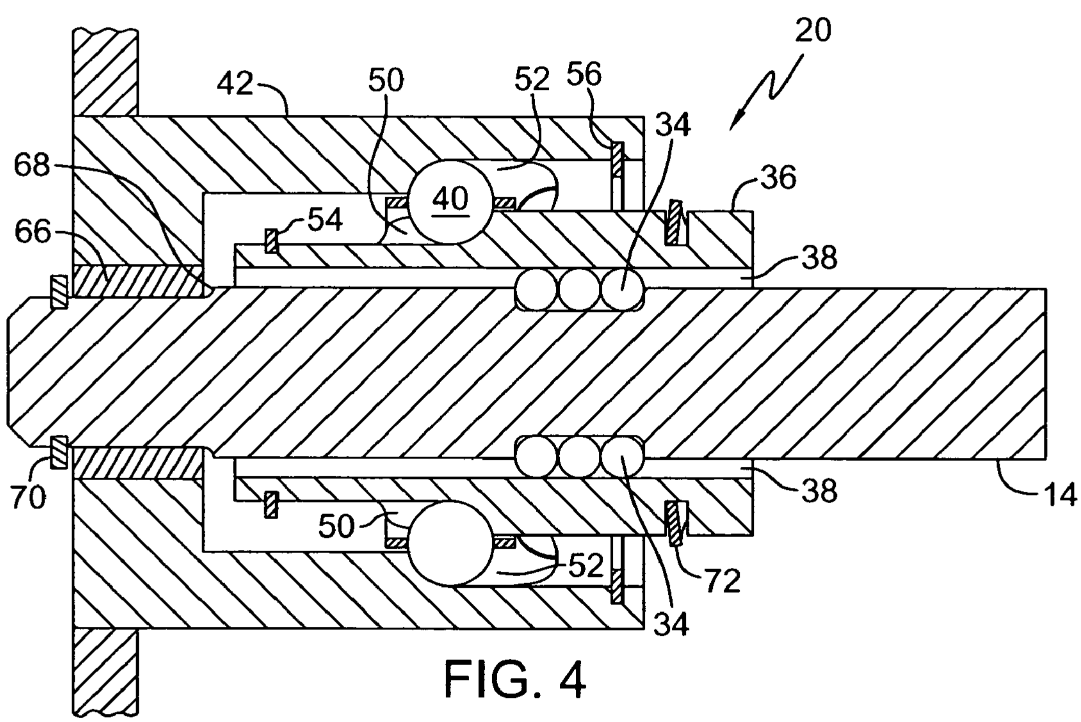
FIG. 4 is a sectioned view of the coupler of FIG. 3 in the engaged position.
Figure 5:
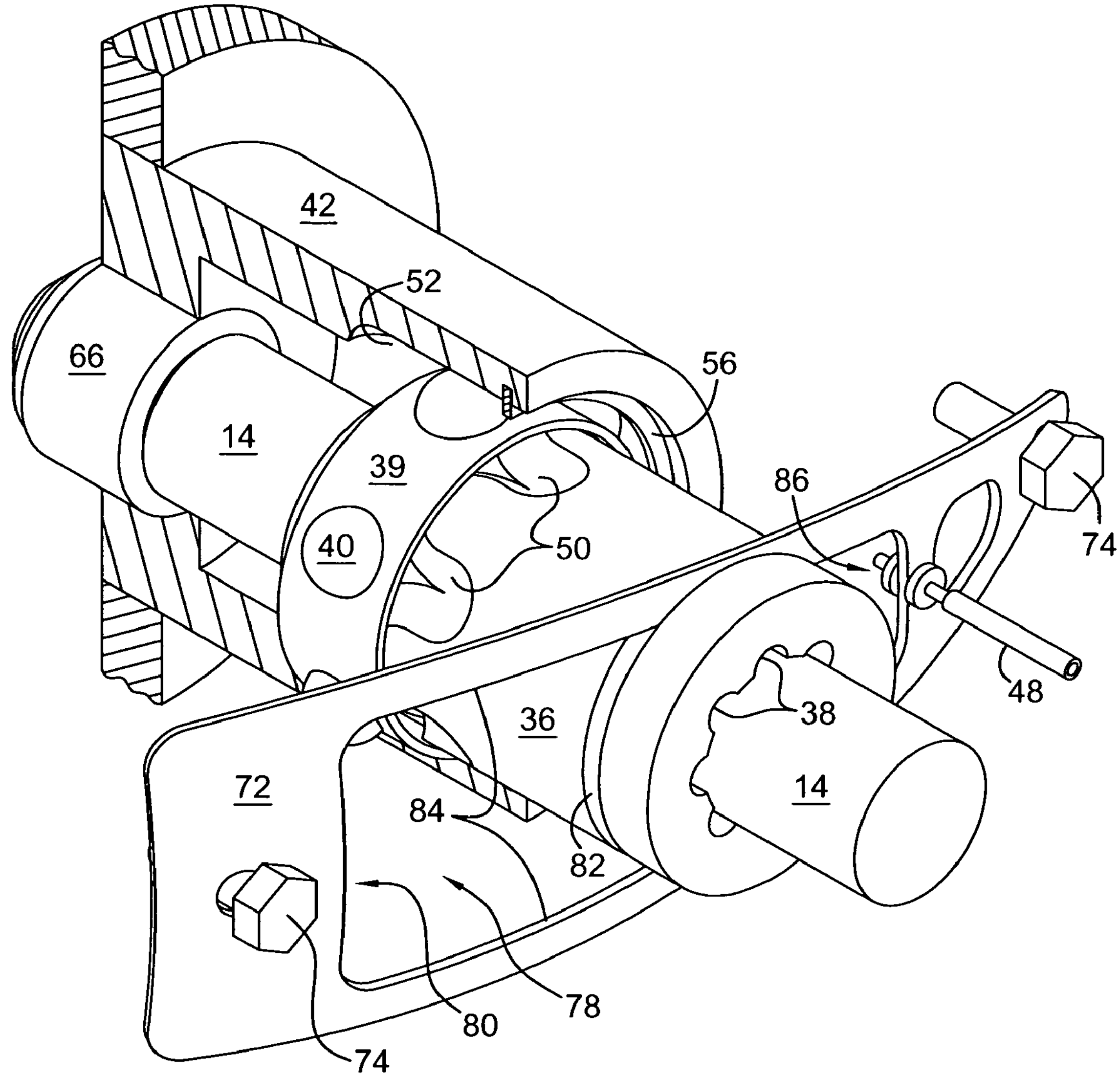
FIG. 5 is a partially sectioned perspective view of the coupler of FIG. 3, shown in the disengaged position with a first embodiment of an actuation mechanism.
Figure 6:
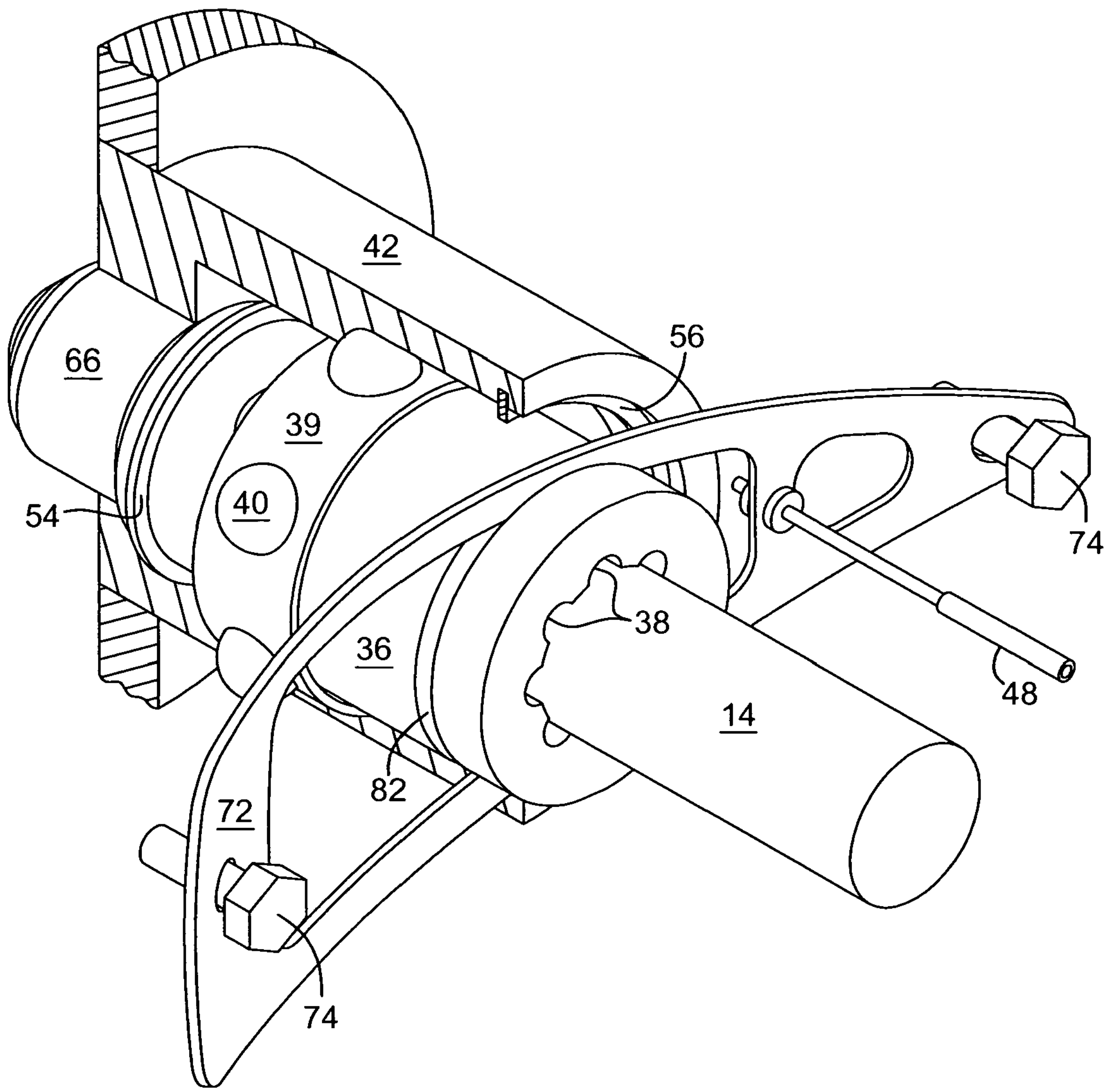
FIG. 6 is a partially sectioned perspective view of the coupler and actuation mechanism of FIG. 5, with the coupler shown in the engaged position.

Coupler mechanism 20 comprises an engagement dog 36 which is mounted on and axially moveable with respect to axle 14 and which is also engageable to wheel hub 42. Coupler 20 has a first engaged position where rotation of axle 14 is transferred to hub 42, as shown in FIGS. 4 and 6, and a second disengaged position where hub 42 is uncoupled from axle 14, as shown in FIGS. 3 and 5. A linkage mechanism 48 is used to move coupler 20 between these two positions.

Axle shaft 14 contains one or more slots or grooves 32 formed therein for containing a plurality of bearing balls 34. Engagement dog 36 is mounted about the periphery of axle shaft 14 and includes grooves 38 formed therein. Bearing balls 34 also engage grooves 38, so that the engagement of bearing balls 34 with both grooves 32 and grooves 38 will cause axle shaft 14 to drive engagement dog 36, while also permitting the axial movement of dog 36. Other suitable engagement means that allow for sliding movement between shaft 14 and engagement dog 36 may also be used in place of balls 34.

Engagement dog 36 also includes a plurality of slots 50 formed on the periphery thereof, and a corresponding set of slots 52 are formed on the inner surface of hub 42. A bearing ring 39 containing a set of caged balls 40 is located between dog 36 and hub 42 to function as an engagement device. When coupler 20 is in the engaged position, balls 40 are located in slots 50 and 52 to transmit movement of axle shaft 14 to wheel 16.

When coupler 20 is moved to the disengaged position, balls 40 are positioned along line 44 on the periphery of dog 36 and line 46 on the interior of hub 42. In this position, balls 40 are free to spin relative to dog 36 and hub 42, and any movement of axle shaft 14 will not be communicated to hub 42.

Figure 7:
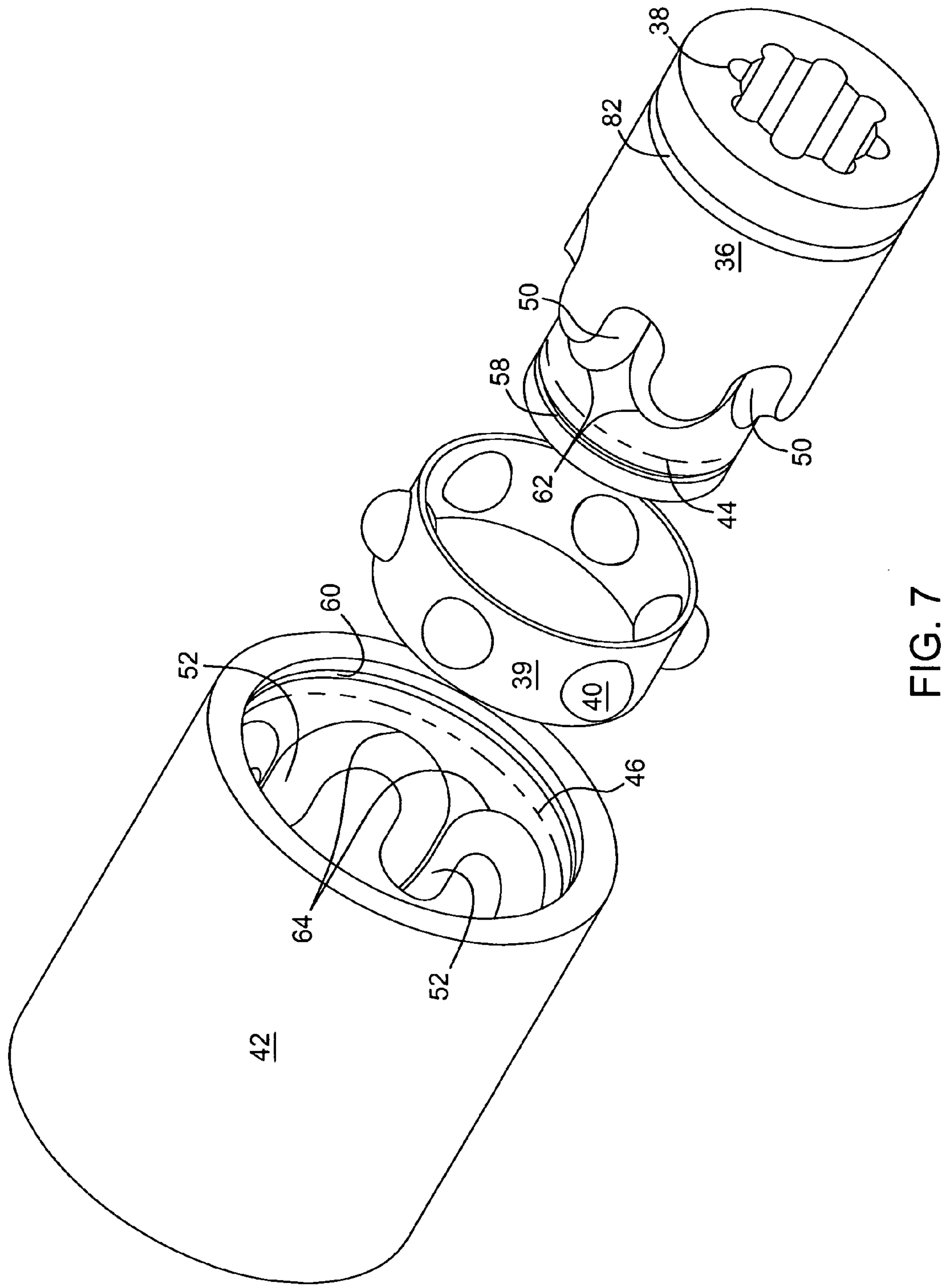
FIG. 7 is an exploded view of the engagement dog, bearing ring, and wheel hub of the coupler shown in FIG. 3.

Retaining rings 54 and 56 may optionally be provided in dog 36 and hub 42, respectively, to aid in maintaining the engagement of dog 36 with coupler 20 in the disengaged position. When dog 36 is moved to a disengaged position, the separation of grooves 50 in dog 36 from grooves 52 in hub 42 will cause balls 40 to immediately become disengaged from one or both sets of grooves. If, for example, balls 40 remain engaged with grooves 50 during movement of dog 36 to the disengaged position, then retaining ring 54 contacts balls 40 and forces them from grooves 50. Slots 50 and 52 may also be optionally shaped to assist in maintaining bearing ring 39 in the region between slots 50 and 52 when dog 36 is disengaged. This is preferably done by forming radii 62 at the ends of slots 50 and by forming radii 64 at the ends of slots 52, as shown most clearly in FIG. 7.

Shaft 14 engages hub 42 by means of a bearing 66. Bearing 66 may be formed as part of hub 42 or may be pressed into hub 42. Hub 42 may then be rotatably constrained on shaft 14 by step 68 and retaining ring 70.

Retaining rings 54 and 56 would stop against balls 40 to maintain engagement of dog 36 and balls 40 if dog 36 were to move that far. As described further below, the engagement mechanism may also maintain the position of dog 36 within coupler 20. Retaining ring 54 is positioned within retaining ring groove 58 in dog 36. Retaining ring 56 is positioned within retaining ring groove 60 in hub 42.

Different mechanisms can be used to move coupler 20 between the engaged and disengaged states. FIGS. 5 and 6 depict a first embodiment of an engagement and disengagement mechanism comprising an over-center plate 72 moved by linkage 48. Because plate 72 is longer than the distance between fasteners 74, it tends to remain in the position established by linkage 48. Thus, in FIG. 5 the position of plate 72 aids in maintaining the disengaged position of dog 36. In FIG. 6 the position of plate 72 aids in maintaining dog 36 in the engaged position. For situations where design requirements dictate a preference for the disengaged position, a bias spring may be added to move plate 72 into the disengaged position upon release of an actuation handle 76.

Opening 78 is used to assist in the assembly of plate 72 to shaft 14. At first end 80, opening 78 is large enough to allow dog 36 to be inserted therein. Dog 36 is inserted until groove 82 is aligned with edges 84 of opening 78. Dog 36 is then moved toward opposite end 86 of opening 78 while edges 84 are engaged in slot 82. End 86 is narrower than the outer diameter of dog 36, and thus the engagement of slot 82 by edges 84 will act to axially constrain dog 36 on shaft 14. Once plate 72 is positioned to constrain dog 36, fasteners 74 may be secured to a mounting bracket. The design of fasteners 74 preferably allows plate 72 to move angularly with respect to fasteners 74 to minimize stress on plate 72. However, plate 72 may also be designed to move in the manner previously described with fasteners 74 tightened against plate 72.

Figure 8:
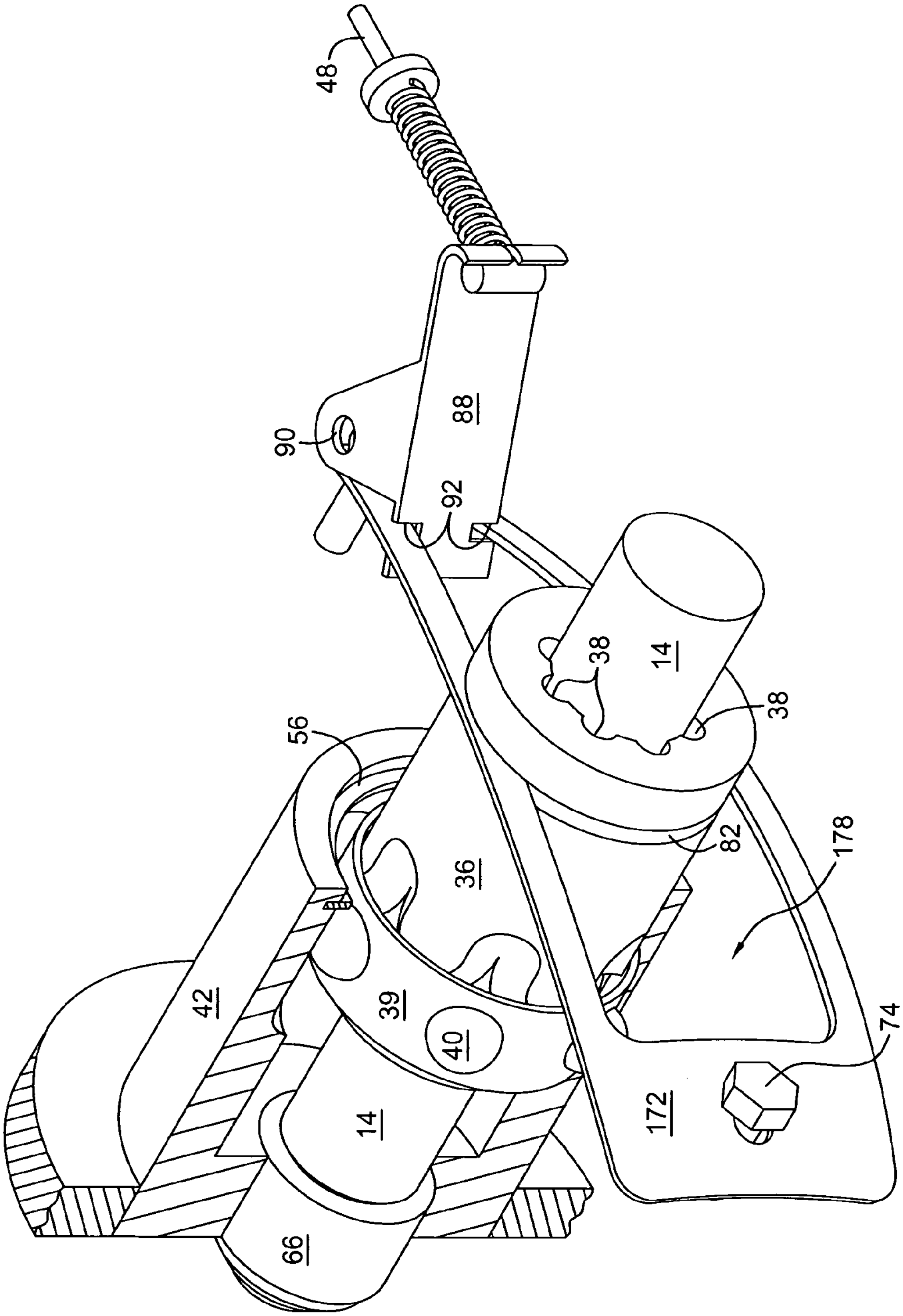
FIG. 8 is a view similar to that of FIG. 5 depicting a second embodiment of an actuation mechanism for the present invention.

FIG. 8 depicts a second embodiment of an actuation mechanism for use in the present invention. In this embodiment, linkage 48 is connected to a pivot plate 88. Pivot plate 88 is pivotally mounted by means of openings 90 to a support bracket (not shown) which would be attached to the vehicle. Movement of linkage 48 causes pivot plate 88 to rotationally move about openings 90, causing plate 172 to move correspondingly by the interaction of plate grooves with plate 172. Plate 88 may be installed in opening 178 similar to the method of installation of dog 36, or plate 88 may be inserted in opening 178 and then rotated to engage grooves 92 with plate 172, and then secured in position by means of pins or other similar devices positioned into openings 90.

Figure 9:
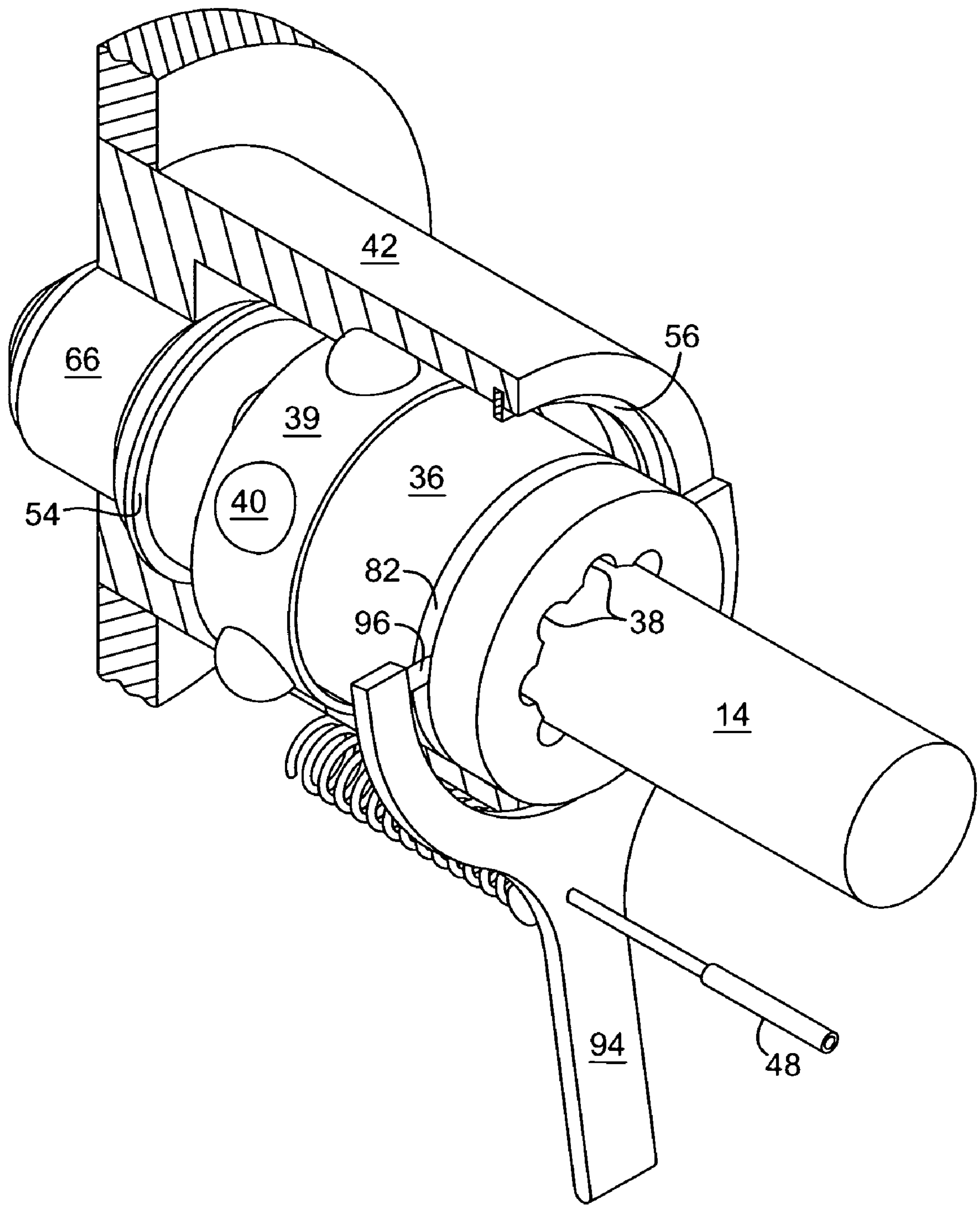
FIG. 9 is a view similar to that of FIG. 5 depicting a third embodiment of an actuation mechanism for the present invention.

FIG. 9 depicts a third embodiment of actuation mechanism for use with this invention, wherein linkage 48 is connected to guide 94, which then interfaces with groove 82 by means of pins 96. The end of 94 opposite to pins 96 would be constrained to provide a pivot for guide 94. It will be understood that other methods of moving the coupler 20 between the engaged and disengaged positions could also be used herewith.

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

What is claimed is:

1. An axle driving apparatus for use in a vehicle having an axle and at least one wheel driven by the axle, the apparatus comprising:

a wheel hub engaged to the driven wheel and comprising a generally cylindrical portion having a first engagement structure located on an interior surface thereof;

a slider member slidably mounted on and driven by the axle and comprising a second engagement structure located on an exterior surface thereof, wherein a portion of the slider member extends into the generally cylindrical portion of the wheel hub;

an engagement device located between the slider member and the generally cylindrical portion of the wheel hub; and a plate secured to the vehicle by two fasteners and engaged to the slider member, wherein the length of the plate is greater than the distance between the two fasteners such that the plate has two stable positions, wherein the first stable position causes the slider member to be disengaged from the wheel hub, and the second stable position causes the slider member to be engaged to the wheel hub.

2. An axle driving apparatus as set forth in claim 1, further comprising at least one slot formed in the axle and a plurality of bearing balls located in the slot to engage the slider member.

3. An axle driving apparatus as set forth in claim 1, wherein the engagement device comprises a being having a plurality of caged balls secured therein.

4. An axle driving apparatus as set forth in claim 1, further comprising a retaining ring secured to the slider member adjacent one end thereof to limit the axial movement of the slider member.

5. A vehicle driving apparatus as set forth in claim 1, wherein the first engagement structure comprises a plurality of slots integrally formed on the interior of the wheel hub.

6. A vehicle driving apparatus as set forth in claim 1, wherein the second engagement structure comprises a plurality of slots integrally formed on the exterior of the slider member.

7. A vehicle driving apparatus as set forth in claim 1, wherein the engagement device is not engaged to either the first or the second engagement structures when in the second position.

8. An engagement apparatus for drivingly connecting a wheel hub to an axle of a vehicle, the apparatus comprising:

a generally cylindrical member extending from the wheel hub and having a first engagement structure formed on the interior thereof;

a slider mounted on the axle and comprising a second engagement structure formed on an exterior surface thereof, wherein a portion of the engagement device extends into the generally cylindrical member; and an engagement device located between the slider and the generally cylindrical portion of the wheel; and a plate for moving the slider between a first position where the engagement device is engaged to both the first and second engagement structures and a second position where the engagement device is not engaged to either the first or second engagement structures, the plate having a first end secured to the vehicle, a second end secured to the vehicle and an opening formed therein between the first end and the second end, the opening having a plurality of edges and a portion of the slider extends through the opening and engages the plate through the edges of the opening.

9. An engagement device as set forth in claim 8, wherein the plate is of an over-center design.

10. An axle driving apparatus as set forth in claim 8, further comprising at least one slot formed in the axle and a plurality of bearing balls located in the slot to engage the slider member.

11. An axle driving apparatus as set forth in claim 10, wherein the engagement device comprises a bearing having a plurality of caged balls secured therein.

12. An axle driving apparatus as set forth in claim 11, further comprising a retaining ring secured to the slider member adjacent one end thereof to limit the axial movement of the slider member.

13. A vehicle driving apparatus as set forth in claim 12, wherein the first engagement structure comprises a plurality of slots integrally formed on the interior of the wheel hub.

14. A vehicle driving apparatus as set forth in claim 8, wherein the second engagement structure comprises a plurality of slots integrally formed on the exterior of the slider member.

15. A vehicle comprising:

a frame having a prime mover mounted thereon;

a transmission driven by the prime mover and comprising a housing mounted on the vehicle frame and an axle extending from the housing;

a pair of wheel assemblies driven by the axle, each wheel assembly comprising:

a wheel hub comprising a generally cylindrical portion having a first engagement structure located on an interior surface thereof;

a slider member slidably mounted on and driven by the axle and comprising a second engagement structure located on an exterior surface thereof, wherein a portion of the slider member extends into the generally cylindrical portion of the wheel hub;

a plate engaged to the slider member and having a first end and a second end;

an opening formed in the plate and extending for a portion of the length of the plate, the opening having a first end and a second end, wherein the opening is wider at the first opening end than it is at the second opening end, and wherein a portion of the slider member extends through the opening; and an engagement device located between the slider member and the generally cylindrical portion of the wheel hub; and having a first position where the engagement device is engaged to both the first and second engagement structures and a second position where the engagement device is disengaged from at least one of the first or second engagement structures.

16. A vehicle as set forth in claim 15, wherein the axle is a single piece unit.

17. A vehicle as set forth in claim 15, wherein the transmission further comprises a hydrostatic transmission.

18. A vehicle as set forth in claim 15, further comprising a snow thrower mounted to the vehicle frame.

19. An axle driving apparatus for use in a vehicle having an axle and at least one wheel driven by the axle, the apparatus comprising:

a wheel hub engaged to the driven wheel;

a slider member slidably mounted on and driven by the axle and having a first position where it is engaged to the wheel hub and a second position where it is disengaged from the wheel hub; and a plate secured to the vehicle by two fasteners and engaged to the slider member, wherein the length of the plate is greater than the distance between the two fasteners such that the plate has two stable positions, wherein the first stable position causes the slider member to be in the first, engaged position, and the second stable position causes the slider member to be in the second, disengaged position.

20. The engagement apparatus of claim 19, wherein the plate is movable with respect to the two fasteners.

21. The engagement apparatus of claim 20, wherein the plate is angularly movable with respect to the fasteners.

22. The engagement apparatus of claim 19, wherein the plate comprises an opening having a first end and a second end, wherein the second end has a smaller width then the first end.

23. The engagement apparatus of claim 19, further comprising an actuator engaged adjacent the second end of the opening.

24. The engagement apparatus of claim 23, wherein the actuator is engaged to the second end by positioning the actuator element in the area of the first end, and then moving the actuator element to the second end, the actuator further comprising slots to engage the edges of the plate opening.

25. An engagement apparatus for drivingly connecting a wheel hub to an axle of a vehicle, the apparatus comprising:

a slider mounted on the axle; and a plate for moving the slider between a first position where it is engaged to the wheel hub and a second position where it is not engaged to the wheel hub, the plate having a first end secured to the vehicle, a second end secured to the vehicle and an opening formed therein between the first end and the second end, the opening having a plurality of edges and a portion of the slider extends through the opening and engages the plate through the edges of the opening.

* * * * *